May 20, 1958  T. F. PAULS  2,835,025
SHEET METAL MAKING
Filed June 11, 1954

INVENTOR:
THERON F. PAULS
BY
John D. Wilkins
ATTORNEY

United States Patent Office 2,835,025
Patented May 20, 1958

2,835,025
SHEET METAL MAKING

Theron F. Pauls, Godfrey, Ill., assignor to Olin Mathieson Chemical Corporation, a corporation of Virginia Application June 11, 1954, Serial No. 436,021

7 Claims. (Cl. 29—157.3)

This invention relates to the manufacture of sheet metal articles and more particularly to the manufacture of hollow articles from sheet metal by fluid pressure inflation.

A method of making hollow articles of sheet metal with practically no need for solder or brazing materials and substantially without the use of electric welding has been developed. By this method as practiced in the manufacture of refrigerator evaporators, for example, weld preventing or stop-weld material is applied in a unidirectionally foreshortened and rather complex pattern between two weldable sheets of metal after which the sheets are placed and secured in superposition and hot rolled to form a single inflatable sheet without the use of any interposed soldering, brazing or welding materials. Upon inflation which may occur between platens of a press, there is erected from and within the sheet a system of passageways of predetermined dimensions and configuration.

In order to inflate the sheet metal unit along its embryonic or potential passageways, part of the stop-weld pattern is extended to an edge at which a pointed tool is applied to make a tubular entrance at the edge of the sheet which connects directly with the non-bonded passageway portions of the sheet metal unit as delineated by the presence of the weld preventing or stop-weld material. The inlet extension of this included material may be and is generally exposed by shearing through the sheet at that point. In any event and particularly with sheet metal of thin gage, it is difficult to locate the line of exposed weld preventing material at the proposed inlet and even more difficult to present the opening tool to it to make a satisfactory opening. The shears in a conventional cutting operation frequently smear the metal at the cut and obliterate the opening. This is especially true of thin sheets of soft metal such as annealed aluminum, copper and drawing steel. Invariably the apparent line of opening is displaced toward one or the other of the surfaces of the sheet, making it ever so much more difficult to pry open the sheet metal labia at the edge of the sheet which define the potential opening.

Therefore, it is an object of this invention to provide a method and apparatus for more readily detecting the inlet lamination at an edge of a roll bonded sheet metal stock and to provide a new and improved technique of forming an inlet opening at the edge of the sheet.

It was found in accordance with this invention that by shearing the roll bonded stock or plate on an angle with respect to its thickness rather than squarely through it that the linear opening is more easily detected and that the construction of the edge is such as to be adaptable to prying open the linear opening very readily. By shearing on an angle the shorter labium is torn slightly at the exposed edge of the limitation at which the stop-weld prevents bonding and the longer labium is caught again by the crossed cutting edges of the shears and is drawn slightly away from the other labium. This results in a very noticeable sign of the location of the inlet lamination. For the purpose of this invention a cut at an angle of at least about 45° to the normal is preferred. An angle of shear of more than 45° but less than 90° to the normal, producing a sloping cut making a more acute angle with the broad surfaces of the sheet than is producable with a 45° cut, is especially suitable for the thinnest gage of basic metal sheet employed. The cut at such an angle leaves one of the labia protruding beyond the other thereby providing a surface against which a force may be applied by an appropriate tool to separate the labia initially so as to facilitate penetration of other implements including an inflation nozzle. Cutting of the roll bonded sheet metal plate 1 by crossed shears at an angle to the thickness and with the usual clearances produces a cut characterized by a sloping face considerably wider than the cross sectional thickness of the plate cut. The effect of shearing the plate in accordance with this invention is to reduce the percent of clearance with respect to the thickness of metal actually cut thereby producing a type of cut generally characterized by a break line across the slope at about the middle of the sheet, i. e. about the actual location of the place where the stop-weld extension intercepts the cut and is preferably exposed. This tends to prevent burnishing or wiping of the metal which in turn tends to obliterate the point of exposure of the stop-weld extension. A further effect is that the labium at which the break occurs is subjected to a pull away from the other labium.

The laminated inflated plate of this invention is adaptable to easy opening by means of a device or a tool which applies a pressure member at the proposed outlet bearing against the protruding labium. The pressure member may be pointed or may merely present an edge to the sloping cut of the sheet metal plate. Such a tool is peculiarly adaptable for operation in association with the sheet metal plate having the tapering or sloping cut disclosed herein.

The invention will be better understood in connection with a description of a specific embodiment together with an accompanying drawing in which.

Figure 1:
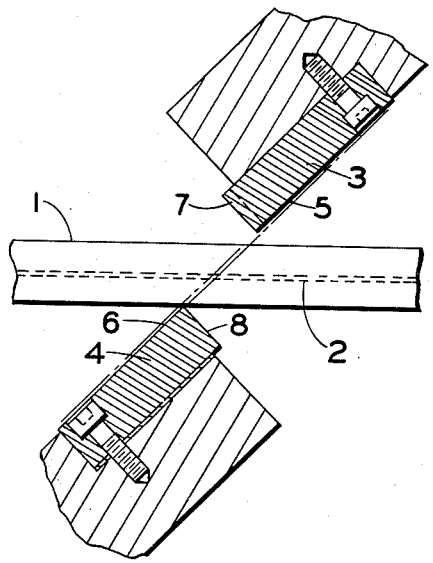
Figure 1 is a side elevational view partially in cross section showing the angular relationship of the shears and the metal plate in accordance with one embodiment of this invention.
Figure 2:
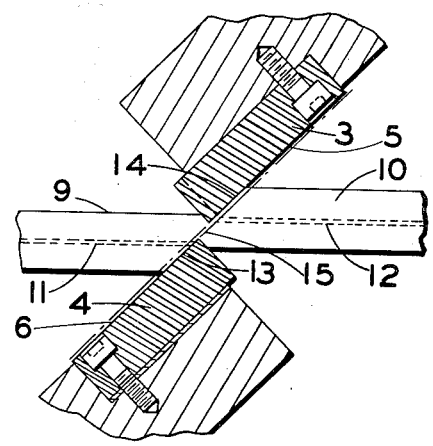
Figure 2 is a side elevational view also partly in cross section showing a succeeding stage of the cutting operation.
Figure 3:
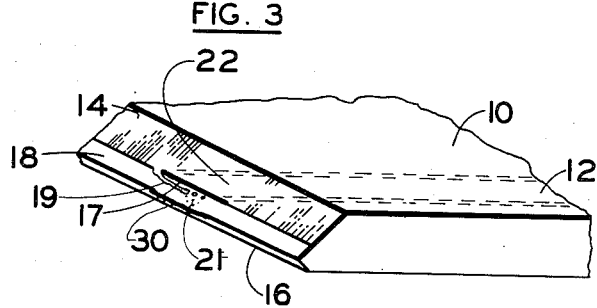
Figure 3 is a fragmentary perspective view showing the structure of the cut produced by the shears.

With reference to Figures 1, 2 and 3 of the drawing, a sheet metal plate 1 of annealed aluminum having an included laminar pattern of weld preventing material or stop-weld is positioned between open shear blades 3 and 4 so that an extension 2 of the pattern is disposed at the bight of the shear. It is advantageous to select in some cases a sheet metal plate 1 having a dual pattern the extension 2 of each of which is common to both. It is apparent that with such an arrangement cutting of sheet metal plate 1 at the extension 2 at the axis of pattern symmetry provides two units with only one cut each of which will be suitable for further operation in accordance with this invention which will become apparent hereinafter.

The front faces 5 and 6 of shear blades 3 and 4 respectively are out of line sufficiently to provide the usual clearance necessary for satisfactory operation of the shearing mechanism. Leading face 7 of blade 3 is swept back as shown in Figures 1 and 2 so that the cutting edge of leading face 7 passes and crosses the cutting edge of leading face 8 of blade 4 with obliquity at the usual angle, generally about 5°. The sheet metal plate 1 is disposed in the bight of the shear in such a manner that the plate makes an angle of about 45° with the cutting plane of the shear.

In operation shear blade 3 is driven toward blade 4, by the usual reciprocating motion. Cutting commences as shown in Figure 2 where the shear blades are shown in position at the moment just before the sheet metal plate 1 is severed to form the two sheet metal units 9 and 10, having the inlet extension 11 and 12, respectively. In the shears shearing begins on the near side of plate 1 and is completed at the far side on account of the sweep back of the cutting edge defined by front face 5 and leading face 7 of blade 3. The approach of blades 3 and 4 causes unit 9 and 10 to be displaced with respect to each other so as to offset extensions 11 and 12 respectively as shown in Figure 2. At this point of the shearing operation, leading faces 7 and 8 have dug into the metal and sheet metal units 9 and 10 have been subjected to shearing movement along the 45° plane during which front face 5 has made a cut and burnished surface 14 on sheet metal unit 10. Similarly front face 6 of blade 4 has made a cut and burnished surface 13 on sheet metal unit 9. With the usual sharpness and clearance of blades 3 and 4 presented to the metal at an angle in accordance with this invention, a point is reached at which a combination of shear and tension forces cause the metal to separate and form a break at 15.

The sheet metal edge structure produced in accordance with this invention, as shown in Figure 3, is characterized by a sloping edge which as a general rule is made up of the smoothly sheared or burnished portion 14 and the fractured portion 18 across both of which the front face 5 of shear blade 3 passed. Indentation 16 is merely the mark left by the leading face 8 of the other shear blade 4. At about the line of demarcation between portions 14 and 18 of the sloping cut, the line 17 of stop-weld at inlet extension 12 is very ostensibly exposed. The line 17 of stop-weld exposure is thus not only very readily located with the unaided eye but is adaptable for application of an opening device with no difficulty.

The action of the crossed shear blades 3 and 4 as the line of cut proceeds from right to left, Figure 3, is such as tends to open the extension 12 at line 17 and renew the cutting action as is often evidenced by an incipient burnished cut 19 adjacent exposed line 17. Where the clearance of the shear blades 3 and 4 is somewhat greater, the action of the blades tends to pull the protuberant labium 21 away from the recedent labium 22. With this type of shear blade action, the surface of fracture 18 is more pronounced at the labium 21 and is further characterized frequently by a slight recession immediately adjacent the line of exposure 17 together with a drawing out of the labium 21 to form a slightly more protuberant burr 30. It is evident that the structure of the cut in this event leaves a minute shoulder at line 17.

Figure 4:
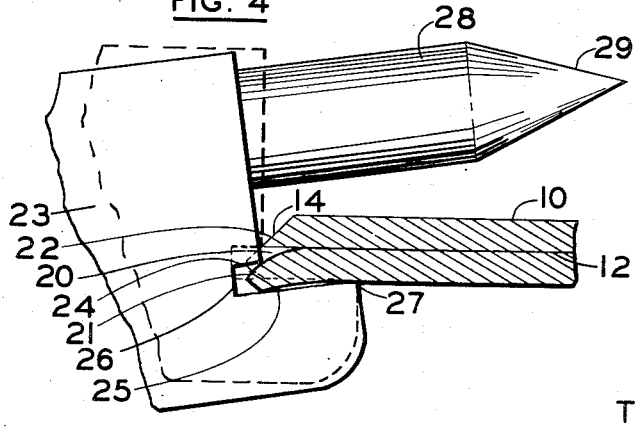
Figure 4 is an elevational view showing one tool suitable for operating on the edge structure to accomplish opening with the metal plate shown in the cross section at the opening.

In order to accomplish opening of the inlet extension 12 at the line of exposure 17, an opener of the type shown in Figure 4 may be applied to produce the opening 20. The tool consists of a body portion 23 having a stepped portion or shoulder 24 spaced from a bearing surface 25 by a gap 26 the width of which is equal to one-half the thickness of sheet metal unit 10. For example, the width of gap 26 is about 0.031 of an inch when the gage of unit 10 is 0.062 of an inch. Tool body 23 is provided with the pivot point 27 about which body 23 together with its shoulder 24 may be turned so that shoulder 24 bears against the protuberant labium 21 thereby prying labium 21 away from receding labium 22 to form the opening 20.

Tool body 23 of the opener also carries means for forming an entrance at inlet extension 12. The means shown takes the form of a drift punch 28 the front end of which is pointed at 29 to facilitate entry of the punch into the initial opening 20.

Since many other embodiments of this invention may occur to those skilled in the art, it is to be understood the foregoing is intended by way of illustration of a preferred embodiment and not as a limitation of the scope of the present invention except as set forth in the appended claims.

What I claim as my invention is:

1. In the process of manufacturing hollow sheet units the steps comprising forming a sheet of material containing internally between non-bonded double-walled portions a predetermined pattern of separation and thereafter shearing said sheet at an angle to the dimension of its thickness through a section including an extension of said separation area thereby exposing part of said separation area between a resultant protuberant labium and receding labium, and finally bending the protuberant labium in a direction away from the other labium to establish an opening for injection of unit distending internal fluid pressure.

2. The process of claim 1 wherein the sheet material is relatively thin wrought metal including a pattern of separation material, and wherein the angle of shear is not less than about 45°.

3. The process of claim 1 including the step of inserting a hollow needle into said opening and injecting therethrough a fluid to produce distention and cavitation of the unit along at least part of said non-bonded wall portions.

4. In the process of manufacturing hollow sheet units including the step of inflation by injection of fluid pressure into the interior of the unit along non-bonded double walled portions of the sheet unit at an opening defined by sheet labia at an edge of the sheet, the improvement which comprises exposing a non-bonded double walled portion at said edge by shaping said edge of the sheet unit at an angle to the dimension of its thickness so as to form a receding labium and a protuberant labium whereby the parting line between the labia is disposed on the plane of the sloping edge normal to the strike of said plane and the more protuberant of the labia may be readily forced out of the plane of the sheet away from the receding labium.

5. The process of claim 4 wherein shaping occurs by shearing at an angle of about 45°.

6. A sheet unit adapted to form a hollow sheet article by inflation by injection of fluid pressure into the interior of the unit along non-bonded double walled portions of the sheet unit, wherein an edge of the sheet is disposed at an angle to the dimension of its thickness so as to form a receding labium and a protuberant labium adapted at least in part to be readily moved away from said receding labium and said edge intersects with an extension of the non-bonbed double walled portion to expose a parting line defined by said labia at said edge of the sheet whereby said line is readily convertible to an access opening upon said relative movement between the labia.

7. The blank of claim 6 wherein the offset between labia occurs at an angle of about 45°.

References Cited in the file of this patent

UNITED STATES PATENTS

| | | |
|---|---|---|
| 1,595,720 | Holmes | Aug. 10, 1926 |
| 1,709,865 | Muffly | Apr. 23, 1929 |
| 2,212,481 | Sendzimir | Aug. 20, 1940 |
| 2,638,025 | Nelson | May 12, 1953 |
| 2,662,273 | Long | Dec. 15, 1953 |
| 2,690,002 | Grenell | Sept. 28, 1954 |
| 2,725,617 | Sternberg | Dec. 6, 1955 |
| 2,740,188 | Simmons | Apr. 3, 1956 |
| 2,763,919 | Kempe | Sept. 25, 1956 |

FOREIGN PATENTS

| | | |
|---|---|---|
| 358,864 | Great Britain | Oct. 15, 1931 |
| 545,742 | Germany | Mar. 4, 1932 |
| 551,209 | Germany | May 27, 1932 |
| 628,976 | Germany | Apr. 20, 1936 |